United States Patent Office 3,289,621
Patented Dec. 6, 1966

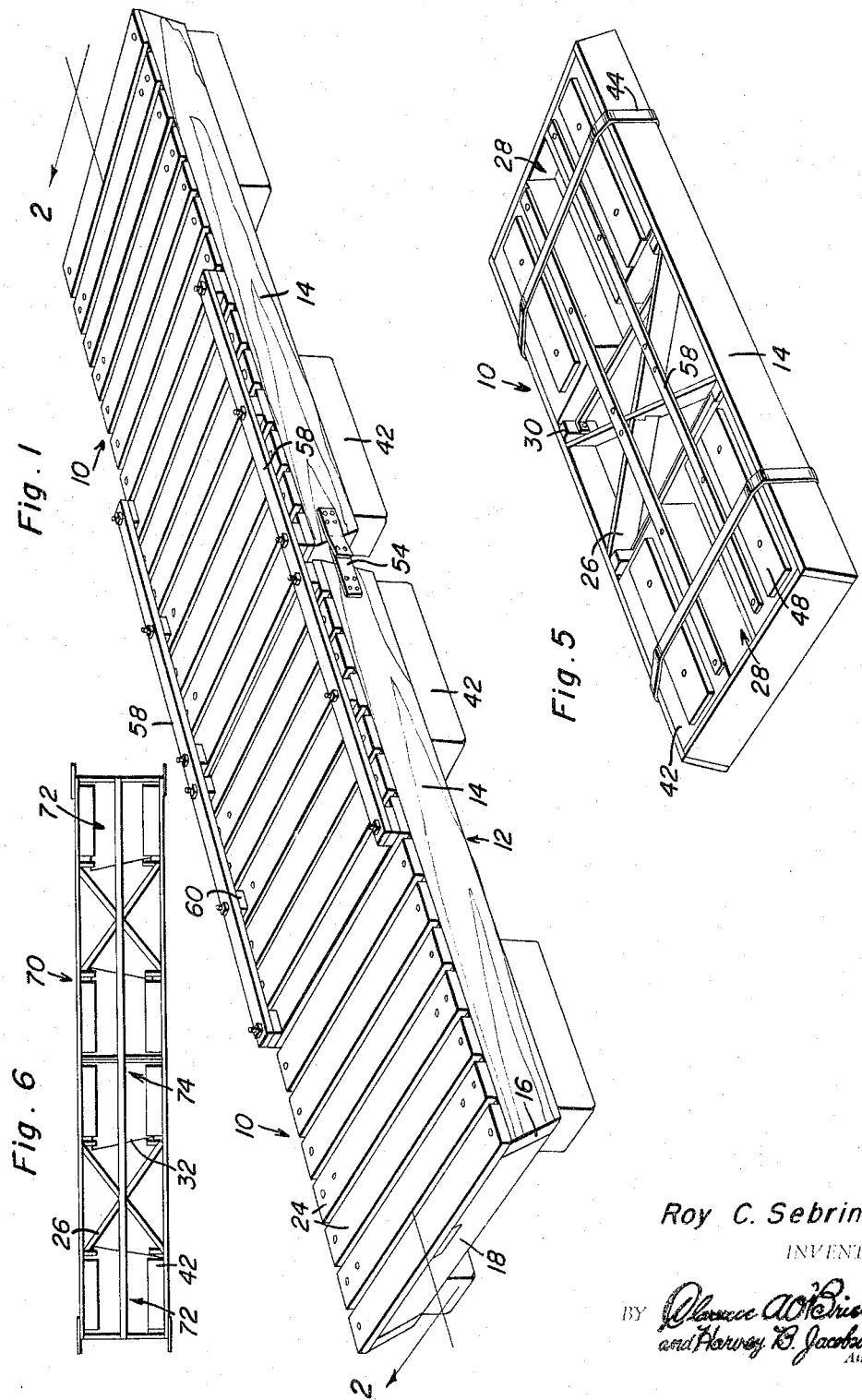

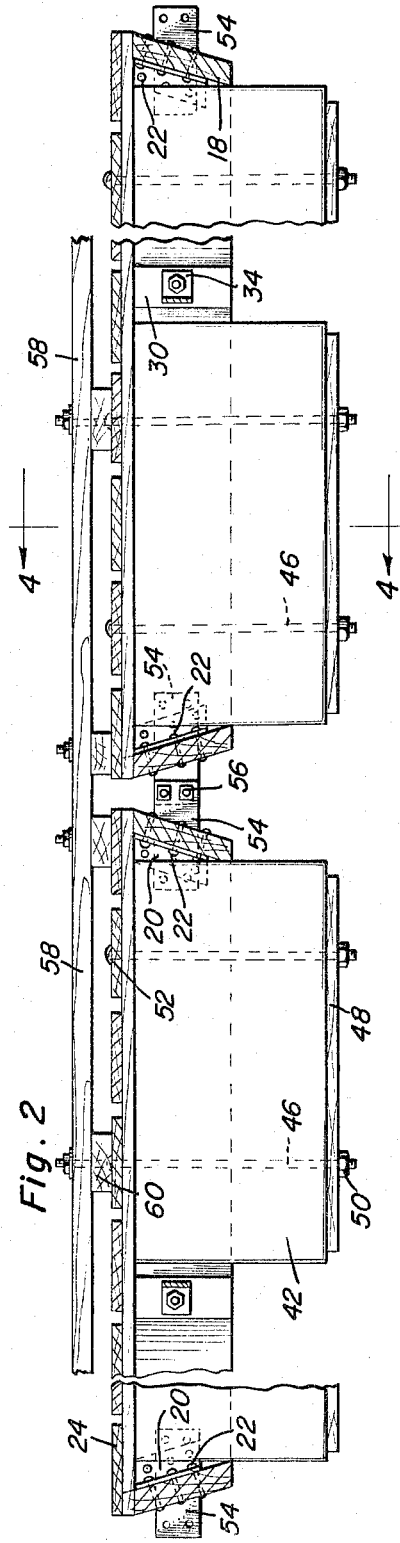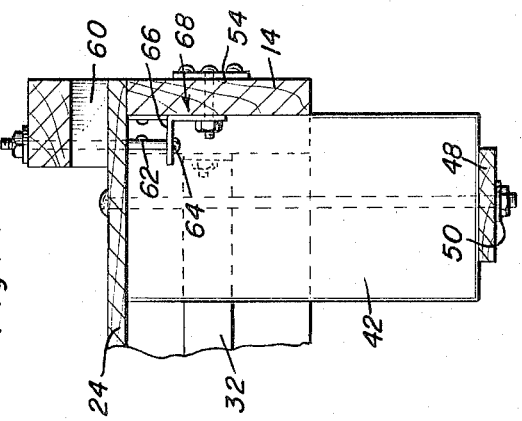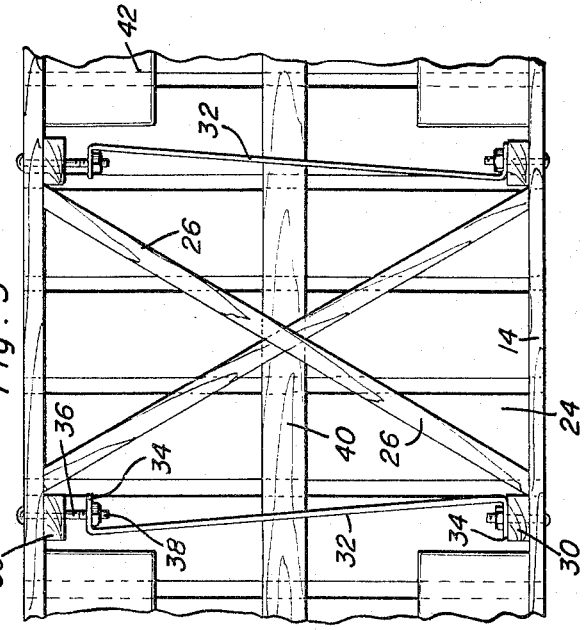

3,289,621
FLOATING DOCK
Roy C. Sebring, Box 19, Southworth, Wash.
Filed Jan. 26, 1965, Ser. No. 428,104
8 Claims. (Cl. 114—.5)

The present invention is specifically concerned with new and useful improvements in dock constructions, and has as a primary object the provision of a prefabricated floating dock.

Another significant object of the instant invention is to provide a self-contained dock section usable either by itself or in conjunction with other similar dock sections depending upon the length of dock desired.

In conjunction with the above object, it is a significant object of the instant invention to provide individual flotation means associated with each dock section, these flotation units or blocks being removably mounted for storage directly within the dock section itself so as to present a compact unit for shipping or storing.

Also, it is an object of the instant invention to provide a dock section which is of a highly rigid nature, incorporating a centrally located cross-bracing in conjunction with tensionable tie bars.

Likewise, it is a significant object of the instant invention to provide for a convenient locking of two or more deck sections in longitudinal alignment with each other.

Basically, the floating dock of the instant invention consists of one or more dock sections, each including spaced side and end walls defining a generally rectangular configuration, spaced deck planking spanning the rectangular frame and secured to the upper edges of the side walls, internal bracing, and flotation units. The internal bracing consists of a pair of centrally located cross members extending between the opposite side walls and drawn into rigid abutting engagement therewith by a pair of tensionable tie bars. This bracing unit, in the illustrated form of dock section, defines a pair of hollow end sections within which the flotation units are received, these flotation units, when turned on their side, being of a height substantially equal to the height of the frame, and thereby being compactly received therein for purposes of shipping. Upon being positioned upright, the flotation blocks project a substantial distance below the frame, thereby enabling a floating of the dock at the desired level. In addition, tie plates and tie beams are provided for stably interlocking adjoining dock sections as needed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating a dock consisting of two dock sections;

FIGURE 2 is an enlarged partial cross-sectional view taken substantially on a plane passing along line 2—2 in FIGURE 1;

FIGURE 3 is a partial bottom plan view illustrating the cross bracing;

FIGURE 4 is an enlarged partial cross-sectional view taken substantially on a plane passing along line 4—4 in FIGURE 2;

FIGURE 5 is a perspective view of a dock section packaged for shipping; and

FIGURE 6 is a schematic showing of a double unit or dock section constructed in accordance with the instant invention.

Referring now more specifically to the drawings, reference numeral 10 is used to generally designate the dock section of the invention, this dock section being usable by itself or in conjunction with one or more other dock sections, as suggested in FIGURE 1, to form a floating dock.

The dock section 10 includes an elongated rectangular frame 12 having spaced parallel vertically orientated elongated side boards or walls 14 having the opposite ends 16 thereof beveled or cut back at approximately a 15° angle. The frame 12 also includes end boards or walls 18 extending between the corresponding ends of the side boards 12 and inclined at the same angle as the ends 16, the side walls 14 and end walls 18 being rigidly bolted together at each corner through the use of elongated steel angles 20 and nutted bolts 22.

The deck of the dock section 10 is formed of a plurality of decking planks 24 extending transversely across the frame and secured, at the opposite ends thereof, to the upper edges of the side boards 14, these planks 24 of course being laterally spaced from each other throughout the length of the dock section 10.

The interior of the dock section 10 is centrally braced by a pair of vertically oriented bracing boards 26, each of a height generally equal to the height of the frame boards 14 and 18. These bracing boards 26, as will be appreciated best from FIGURES 3 and 5, extend at an angle between the side boards 14 within an intermediate area along the length of the dock section 10 so as to define a pair of end compartments 28. Each of the bracing boards 26 is centrally notched through approximately one-half of the height thereof, these notched portions receiving the aligned notched portion of the companion bracing board 26 so as to provide for an interlocked coplanar orientation of the two crossed brace boards 26. Further, it will be noted that each of the side boards 14 is provided with an abutment block 30 rigidly fixed to the inner face thereof adjacent the outer side of each end of the bracing boards 26, thereby providing for a stabilization of the ends of the bracing boards 26. Further rigidification of the frame 12, and a locking of the bracing boards 26 in position, is achieved through a pair of elongated tensioning bars 32. These tensioning bars 32 have the opposite ends 34 thereof reversely bent and bolted to the side boards 14 through the opposed abutment blocks 30 by means of elongated threaded bolts 36 having tensioning nuts 38 threaded thereon. These tensioning bars 32, referring specifically to FIGURE 3, are to be slightly shorter than the over-all width of the dock section 10 so as to enable a tensioning of these bars 32 and a positive inward drawing of the side boards 14 rigidly against the crossed bracing boards 26, thereby providing for an extremely rigid unit. In addition, the dock section 10 is further braced by the provision of a single full length longitudinally extending support board 40 positioned against the undersurface of the deck planking 24 and supported, at the ends thereof, within notches in the end boards 18, and centrally by the cross bracing boards 26.

The two end compartments 28 receive, in each instance, a pair of enlarged rectangular polystyrene flotation blocks 42, these blocks 42, of expanded or foam plastic possessing a susbtantial degree of buoyancy. For example, it has been found that four such blocks twelve inches by nineteen inches by thirty-six inches are more than sufficient so as to support a four foot by ten foot dock section constructed in the above described manner. As will be appreciated from FIGURE 5, these flotation blocks 42 are of a size so as to, when laid on their side, be substantially completely received within the corresponding compartments 28, thereby providing in effect a flat package about which metal strapping 44 can be applied, thereby providing a compact package for shipping or storing. Upon vertically positioning the flotation blocks 42 within their corresponding compartments, it will be noted that the blocks 42 project a substantial distance below the frame 12 in parallel spaced relation to each other, thereby providing a wide stable flotation means for the dock section 10. In this second position, the flotation blocks 42 are bolted in position by elongated threaded bolts 46 extending vertically through selected ones of the deck planking 24, through the flotation blocks 42 themselves, and finally through an elongated bearing board 48 associated with each block 42. Suitable nuts 50 are then threaded on the projecting lower ends of the rods 46 and tightened thereon so as to draw the bearing boards 48 upwardly against the bottom of the flotation blocks 42 so as to effect a firm clamping of the flotation blocks 42 against the undersurface of the deck planking 24. The elongated bolts 46 of course have enlarged heads 52 thereon which bear against the upper surface of the deck planking 24. The ability of the flotation blocks 42 to be received substantially completely within the surrounding dock frame 12 when the entire section 10 is packed for shipping is considered a particularly significant feature both from the viewpoint of compactness of the unit, and from the substantial protection afforded to the flotation blocks 42 in this manner, the bearing boards 48, referring again to FIGURE 5, overlying and further protecting the flotation blocks 42 in the package.

When it is desirable to use two or more dock sections 10 in conjunction with each other, the adjacent ends of the dock sections 10 are provided with a projecting rectangular steel locking plate 54 bolted to each side board 14 and projecting longitudinally therebeyond for releasable bolting, as at 56, to the projecting end of a similar plate 54 on the adjacent section 10. This bolting of the plate ends together is greatly facilitated by the angled end boards 18, which also allow for a slight movement of the sections relative to each other under extreme weather conditions. Further rigidity is introduced to the joined dock sections 10 through a pair of elongated side rails 58, one positioned along each side of the adjoining dock sections 10. These side rails 58 overlap each dock section 10 by a substantial amount and are bolted to the upper surface thereof through small spacer blocks 60 which act so as to position the rail 58 above the deck planking 24, thereby providing, in conjunction with the locking plates 54, a greater resistance to movement of the dock sections 10 relative to each other. The elongated bolts 62 which secure each of the side rails 58 have the headed lower ends 64 thereof received through the inwardly projecting legs 66 of a plurality of steel angles 68 bolted to the inner faces of the side boards 14 in spaced relation below the undersurface of the deck planking 24. Incidentally, referring again to FIGURE 5, it will be noted that the side rails 58 are also compactly received within the packaged unit.

From the foregoing, it will be appreciated that a highly novel dock section has been defined, this dock section of prefabricated construction, possessing an arrangement of structural members which produce a highly stable and satisfactory dock consisting of one or more sections. In addition, the unique construction of the dock section of the instant invention possesses significant advantages both in its ability to be compacted for shipping purposes, and its ability to be rigidly locked, when in use, to adjacent similar sections. Further, while the specific dock section described supra has been set forth as having a single centrally located bracing unit, this arrangement being preferred in sections of approximately ten foot length, it should be appreciated that various other length dock sections can be constructed as an integral unit, it being particularly contemplated that a twenty foot unit 70 be provided. This twenty foot unit, rather than having a single centrally located bracing group 26 and 32, is to have a pair of such bracing groups longitudinally spaced from each other so as to define a pair of end compartments 72, similar to compartments 28, for receiving, in each instance, a pair of flotation blocks 42, and a single enlarged partitioned central flotation compartment 74 capable of receiving four flotation blocks. In this form in particular, the full length side boards 14 can be laminated for additional rigidity. Also, while not specifically illustrated, the various sections can be orientated in side by side relation with each other, rather than or in conjunction with the longitudinal arrangement shown in FIGURE 1, as either a pair of detachable sections or as an integral unit with only one intermediate side board between the two portions, both braced in the same manner as section 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A prefabricated dock section comprising an elongated substantially horizontal frame, deck planking overlying and secured to said frame, internal bracing means within said frame below said planking, a pair of downwardly opening compartments, one adjacent each end of the dock section and defined by the frame and bracing means, flotation means located within each compartment, and means fixing the flotation means in each compartment, in a manner so as to project vertically below the frame, said flotation means being removably mounted and movable to a second position substantially completely received within the compartments, said frame including a pair of parallel spaced side boards and a pair of parallel spaced end boards rigidly interconnected into a rigid rectangular frame, said internal bracing means including a pair of rigid bracing members crossing each other and extending into abutting engagament with the two side boards at longitudinally spaced points along an intermediate portion thereof, a pair of elongated tension bars engaged between the side boards adjacent the bracing members, and means for tensioning said bars and drawing said side boards toward each other and into clamping engagement with the bracing members.

2. The structure of claim 1 in combination with a second longitudinally aligned duplicate section, both sections including locking plates fixed to each side board and projecting longitudinally therefrom toward the other section, the locking plates on the corresponding sides of the sections overlapping each other, and means fixing the overlapped plates to each other.

3. The structure of claim 2 including a pair of rigid elongated side rails, each overlying the adjacent sections, one along each side thereof, and means fixing each rail to both sections in approximately the same vertical plane as the locking plates.

4. The structure of claim 3 including spacing blocks positioning each side rail above the deck planking of the two sections.

5. The structure of claim 2 wherein the adjoining end boards of the section frames are inwardly angled so as to provide an enlarged space between the sections below the deck planking.

6. A prefabricated dock section comprising an elongated substantially horizontal frame, deck planking overlying and secured to said frame, internal bracing means within said frame below said planking, a pair of downwardly opening compartments, one adjacent each end of the dock section and defined by the frame and bracing means, flotation means located within each compartment, and means fixing the flotation means in each compartment in a manner so as to project vertically below the frame, said frame including a pair of parallel spaced side boards and a pair of parallel spaced end boards rigidly interconnected into a rigid rectangular frame, said internal bracing means including longitudinaly spaced pairs of rigid bracing members, the members of each pair crossing each other and extending into abutting engagement with the two side boards at longitudinally spaced points along an intermediate portion thereof, a pair of elongated tension bars engaged between the side boards adjacent each pair of bracing members, and means for tensioning said bars and drawing said side boards toward each other and into clamping engagement with the bracing members.

7. A prefabricated dock section comprising an elongated substantially horizontal frame, deck planking overlying and secured to said frame, internal bracing means within said frame below said planking, a pair of downwardly opening compartments, one adjacent each end of the dock section and defined by the frame and bracing means, flotation means located within each compartment, and means fixing the flotation means in each compartment in a manner so as to project vertically below the frame, said frame including a pair of parallel spaced side boards and a pair of parallel spaced end boards rigidly interconnected into a rigid rectangular frame, said internal bracing means including a pair of rigid bracing members crossing each other and extending into abutting engagement with the two side boards at longitudinally spaced points along an intermediate portion thereof, a pair of elongated tension bars engaged between the side boards adjacent the bracing members, and means for tensioning said bars and drawing said side boards toward each other and into clamping engagement with the bracing members.

8. A prefabricated dock section comprising an elongated substantially horizontal frame, deck planking overlying and secured to said frame, internal bracing means within said frame below said planking, downwardly opening compartments defined by the frame and bracing means, flotation means located within said compartments, means fixing the flotation means in a manner so as to project vertically below the frame, said frame including a pair of parallel spaced side boards and a pair of parallel spaced end boards rigidly interconnected into a rigid rectangular frame, a second longitudinally aligned duplicate section, both sections including locking plates fixed to each side board and projecting longitudinally therefrom toward the other section, the locking plates on the corresponding sides of the sections overlapping each other, means fixing the overlapping plates to each other, a pair of rigid elongated side rails, each overlying the adjacent sections, one along each side thereof, and means fixing each rail to both sections in approximately the same vertical plane as the locking plates, the adjoining end boards of the section frames being inwardly angled so as to provide an enlarged space between the sections below the deck planking.

References Cited by the Examiner
UNITED STATES PATENTS

| | | | |
|---|---|---|---|
| 2,879,735 | 3/1959 | Pointer | 114—0.5 |
| 3,012,533 | 12/1961 | Tellefsen | 114—0.5 |
| 3,024,753 | 3/1962 | Benson | 114—0.5 |
| 3,073,274 | 1/1963 | Lamb | 114—0.5 |
| 3,102,503 | 9/1963 | Sheffield | 114—0.5 |
| 3,147,727 | 9/1964 | Weiss et al. | 114—0.5 |

MILTON BUCHLER, *Primary Examiner.*

T. M. BLIX, *Assistant Examiner.*